(12) United States Patent
Schödlbauer

(10) Patent No.: US 6,404,186 B1
(45) Date of Patent: Jun. 11, 2002

(54) POSITION SENSOR WITH MAGNETIC FIELD SENSOR IN WORKING AIR GAP

(75) Inventor: Dieter Schödlbauer, München (DE)

(73) Assignee: RUF Electronics, GmbH (DE)

( * ) Notice: Subject to any disclaimer, the term of this patent is extended or adjusted under 35 U.S.C. 154(b) by 0 days.

(21) Appl. No.: 09/589,780

(22) Filed: Jun. 8, 2000

(30) Foreign Application Priority Data

Jun. 11, 1999 (DE) .......................................... 199 26 738

(51) Int. Cl.[7] ................................................. G01B 7/14
(52) U.S. Cl. .................................. 324/207.2; 338/32 H
(58) Field of Search ........................ 324/207.12, 207.2, 324/207.22, 207.24, 207.25, 207.26, 207.21, 207.23; 338/32 H

(56) References Cited

U.S. PATENT DOCUMENTS 5,532,585 A  7/1996  Oudet et al. ............ 324/207.22
5,600,238 A * 2/1997  Holloway et al. ...... 324/207.21
6,175,233 B1 * 1/2001  McCurley et al. ....... 324/207.2

FOREIGN PATENT DOCUMENTS

DE  4400616 C2  7/1995
DE  19738316 A1  3/1999

* cited by examiner

*Primary Examiner*—Edward Lefkowitz
*Assistant Examiner*—Subhash Zaveri
(74) *Attorney, Agent, or Firm*—Senniger, Powers, Leavitt & Roedel

(57) ABSTRACT

Position sensor having two pairs of flux-concentrating pieces, arranged in succession along a shifting direction of a permanent magnet. The pieces form a primary air gap in which the magnet may be linearly shifted and form a working air gap in which a Hall probe is arranged. To eliminate the influence of foreign magnetic fields in the axial direction, the Hall probe is arranged in the working air gap so that its direction of measuring sensitivity is perpendicular to the shifting direction of the magnet.

13 Claims, 5 Drawing Sheets

US 6,404,186 B1

POSITION SENSOR WITH MAGNETIC FIELD SENSOR IN WORKING AIR GAP

CROSS REFERENCE TO FOREIGN APPLICATION

This application claims priority based on German Utility Model No. 199 26 738.3, filed Jun. 11, 1999, the entire disclosure of which is incorporated herein by reference.

BACKGROUND OF THE INVENTION

The invention relates generally to position sensors and, particularly, to a position sensor having a working air gap arranged relative to a magnetic field sensor such that the measuring sensitivity of the magnetic field sensor is perpendicular to the shifting direction of the magnet.

U.S. Pat. No. 5,532,585, the entire disclosure of which is incorporated herein by reference, discloses a position sensor in which a permanent magnet is linearly shifted in a primary air gap between ferromagnetic flux-concentrating pieces. A working air gap, perpendicular to the primary air gap, is present between two flux-concentrating pieces. In this instance, the working air gap features a magnetic field sensor in the form of a Hall probe, the direction of sensitivity of which is parallel to the shifting direction of the magnet.

When using a sliding position sensor having a Hall-effect probe, care must be taken to prevent the interfering influence of foreign magnetic fields that invalidate the measurement result. For example, suitable shielding measures may be undertaken to prevent this interference. However, if a position sensor must be connected to an electromagnetic actuator to form a compact unit, shielding measures are often not sufficient or are very costly.

Such a situation occurs, for instance, when using a position sensor together with a solenoid. One such example is the regulation of a valve in the exhaust gas recirculation system of an internal combustion engine. In this connection, the solenoid may produce an axial interference field that may assume significant values, particularly along the axis of symmetry. For the aforementioned position sensor, such an axial interference field may have an effect on the Hall-effect probe and consequently invalidate the measurement result.

For these reasons, a position sensor of the aforementioned type is needed that is insensitive to the greatest possible extent to magnetic interference fields, particularly those acting coaxial with the shifting direction.

SUMMARY OF THE INVENTION

The invention meets the above needs and overcomes the deficiencies of the prior art by providing an improved position sensor. Among the several objects of this invention may be noted the provision of a position sensor that largely eliminates the influence of axial magnetic interference fields.

According to a refinement of the invention, the flux-concentrating pieces are developed to be symmetrical with the primary air gap and working air gap. The primary and working air gap are preferably located in the same plane. The effective area of the working air gap is preferably smaller than the effective area of the primary air gap, allowing the utilized magnetic flux density to be increased in the working gap.

According to a refinement of the invention, two generally equal pairs of flux-concentrating pieces are arranged in succession in the shifting direction. Each pair of flux-concentrating pieces forms a magnetic circuit. The two magnetic circuits formed in this way are magnetically coupled by means of a coupling gap. Preferably, a magnetic field sensor, which preferably is a Hall-effect probe, is arranged in each magnetic circuit. If a magnet is located essentially completely in the primary air gap of a first pair of flux-concentrating pieces, then in this position, the magnetic flux density is at a maximum in the working gap of this pair of flux-concentrating pieces and at a minimum in the working gap of the other pair of flux-concentrating pieces. The aforementioned magnetic coupling of the two magnetic circuits by the coupling gap is responsible for the presence of a nonzero flux density in the second working gap. If the magnet is shifted successively from the primary air gap of the first pair of flux-concentrating pieces into that of the second, then the flux density increases in the second working gap and decreases in the first. By dimensioning the geometric measurements, the most linear path possible for the Hall voltage may be achieved as a function of the shifting path.

Briefly described, a position sensor embodying aspects of the invention includes ferromagnetic flux-concentrating pieces defining a primary air gap and a working air gap between the pieces. A permanent magnet, which is movable along a shifting direction, is positioned in the primary air gap between the flux-concentrating pieces. The position sensor also includes a magnetic field sensor positioned in the working air gap between the flux-concentrating pieces. The magnetic field sensor is arranged relative to the working air gap so that its direction of measuring sensitivity is substantially perpendicular to the shifting direction of the magnet.

In another embodiment, a position sensor according to the invention has first and second pairs of ferromagnetic flux-concentrating pieces. Each pair of flux-concentrating pieces defines a primary air gap and a corresponding working air gap between the pieces. Each primary air gap is separated from its corresponding working air gap. A permanent magnet, which is movable along a shifting direction, is positioned in the primary air gaps between the flux-concentrating pieces. The first and second pairs of flux-concentrating pieces are arranged so that the permanent magnet is movable within the primary air gap of each pair of flux-concentrating pieces. The position sensor also includes a magnetic field sensor positioned in the working air gap between each pair of flux-concentrating pieces. Each magnetic field sensor is arranged relative to the respective working air gap so that its direction of measuring sensitivity is substantially perpendicular to the shifting direction of the permanent magnet.

Alternatively, the invention may comprise various other methods and systems.

Other objects and features will be in part apparent and in part pointed out hereinafter.

BRIEF DESCRIPTION OF THE DRAWINGS

The invention will be explained in greater detail below with the aid of an embodiment with reference to the drawing.

DETAILED DESCRIPTION OF PREFERRED EMBODIMENTS

Figure 1:
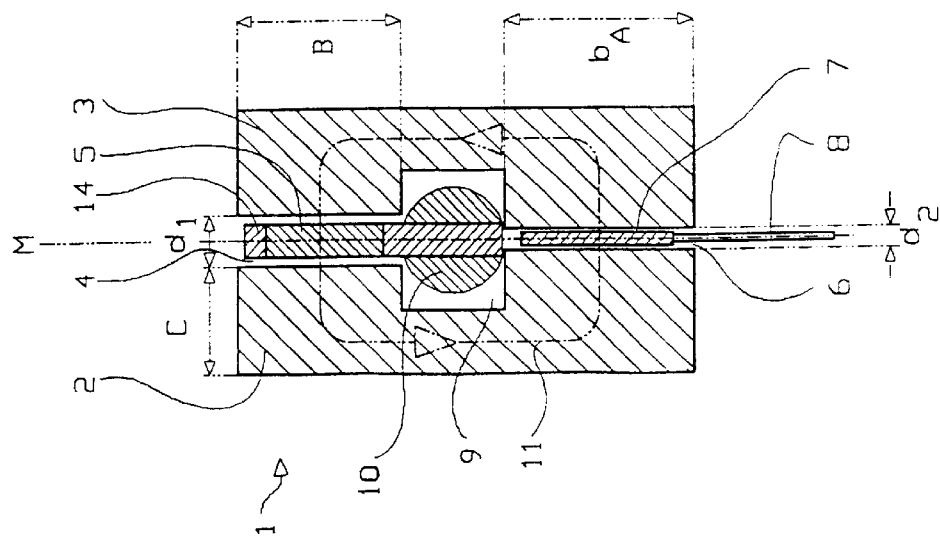
FIG. 1 is a schematic cross section of a position sensor according to a preferred embodiment of the invention.

Referring now to the drawings, FIG. 1 illustrates a position sensor 1 embodying aspects of the invention. In the illustrated embodiment, the position sensor 1 has two flux-concentrating pieces 2, 3 of ferromagnetic material, such as an FeNi alloy, or pure iron, produced, for example, in a sintering process. The two flux-concentrating pieces 2, 3 are preferably developed or constructed to be substantially mirror symmetrical about a central plane M. As arranged, flux-conducting pieces 2, 3 form a primary air gap 4 therebetween having a width $d_1$. A permanent magnet 5 may be linearly shifted in the primary air gap 4. A working air gap 6 between flux-conducting pieces 2, 3 has a width $d_2$. In this instance, a Hall probe 7 is arranged in the working air gap 6. Terminal legs 8 of the Hall probe 7 project beyond the contours of the flux-concentrating pieces 2, 3.

In the embodiment shown in FIG. 1, the width $d_1$ of primary air gap 4 is greater than the width $d_2$ of working air gap 6. The flux-concentrating pieces 2, 3 have a thickness C in the area of the primary air gap 4. Reference character B denotes the height of the primary air gap 4 and reference character $b_A$ denotes the height of the working air gap 6. The middle region of both flux-concentrating pieces 2, 3 has a recess 9 through which a plunger 10 is guided. According to a preferred embodiment of the invention, the permanent magnet 5 is mounted on the plunger 10 so that they are shifted together as plunger 10 moves in recess 9.

The magnet 5 is preferably magnetized through its thickness, which is also its edge having the smallest length. Consequently, a resulting magnetic flux passes through primary air gap 4, flux-concentrating piece 2, working air gap 6, Hall probe 7, and flux-concentrating piece 3, as indicated schematically by a field line 11. The primary direction of sensitivity of the Hall probe 7 consequently lies substantially perpendicular to the central plane M and substantially perpendicular to a longitudinal axis of plunger 10. The magnetic flux of magnet 5 consequently passes through the primary direction of sensitivity of the Hall probe 7. However, Hall probe 7 does not detect axial interference fields coaxial to the axis of the plunger 10.

Figure 2:
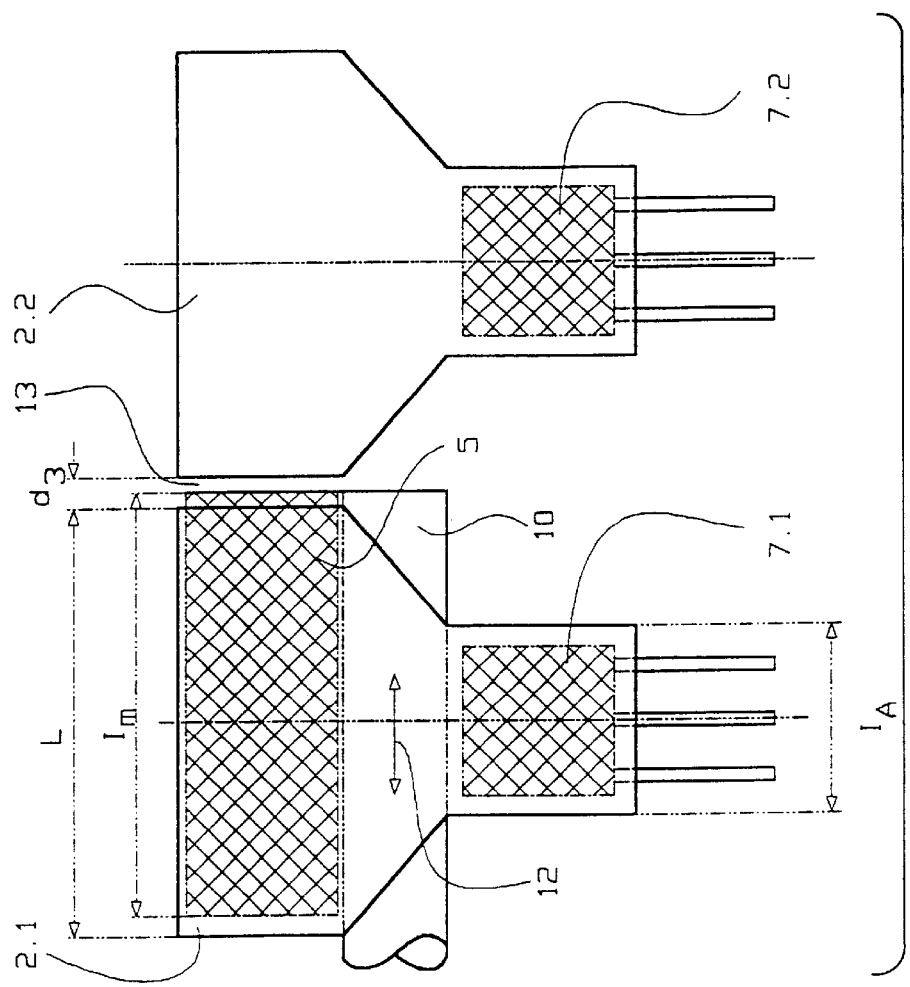
FIG. 2 is a schematic top view of the position sensor of FIG. 1.

In an alternative embodiment, FIG. 2 shows a top view of a position sensor having two magnetic circuits, namely, two pairs of flux-concentrating pieces arranged in succession in the shifting direction of magnet 5. As shown in FIG. 2, an arrow 12 indicates the shifting direction of magnet 5. This top view illustrates one flux-concentrating piece 2.1 of one pair and one flux-concentrating piece 2.2 of the other pair. The two flux-concentrating pieces of each pair are magnetically coupled across a coupling gap 13, which has a width $d_3$. Here, each magnetic circuit has a Hall probe 7.1 or 7.2. However, it is also possible to assign only one Hall probe to a magnetic circuit. Also, the pairs of flux-concentrating pieces of the individual magnetic circuits may be developed differently.

The length of each flux-concentrating piece 2.1, 2.2 in the shifting direction 12 is indicated by L. The length $l_m$ of magnet 5 in the shifting direction 12 is greater than or equal to the length $X_0$ of the maximum shifting distance plus the width $d_3$ of the coupling gap 13. For a length L of the flux-concentrating pieces, $L \geq X_0 + d_3$ likewise applies such that, in practice, the overall structural length of a pair of flux-concentrating pieces is somewhat more than $2X_0 + 3d_3$.

In a preferred embodiment of the invention, L×B defines a cross-sectional area $F_1$ of primary air gap 4. Similarly, $l_A \times b_A$ defines a cross-sectional area $F_2$ of working air gap 6. The area $F_2$ is preferably less than the area $F_1$, increasing the utilized magnetic flux density in the working gap 6. In this embodiment, $l_A$ is less than L. Consequently, if B is greater than or equal to $b_A$, the cross-sectional area of the working gap 6 is less than that of the primary air gap 4.

In the maximum position of magnet 5 shown in FIG. 2, the flux density in the working gap of flux-concentrating piece 2.1 is at a maximum, while the flux density in that in the working gap of flux-concentrating piece 2.2 is at a minimum. Based on a coupling at the coupling gap 13, a non-zero flux density is also present in the working gap of flux-concentrating piece 2.2, such that the Hall probe 7.2 also gives off a (minimal) measuring signal in this position.

If the magnet 5 is shifted successively from the primary air gap of the first pair of flux-concentrating pieces 2.1 into the primary air gap of the second pair of flux-concentrating pieces 2.2, the flux density increases in the second working gap as it decreases in the first. An essentially linear signal is obtained in both Hall probes as a function of the position of the magnet 5 and, consequently, as a function of the position of the plunger 10 connected to it. Due to the coupling gap 13, the aforementioned signal will not, in fact, lie precisely at zero even in the maximum position. By means of a corresponding correction in an evaluating circuit, the output characteristic curve may be transferred to any desired voltage range and, for example, even achieve a zero crossing of the output characteristic curve in one of the maximum positions.

Figure 3:
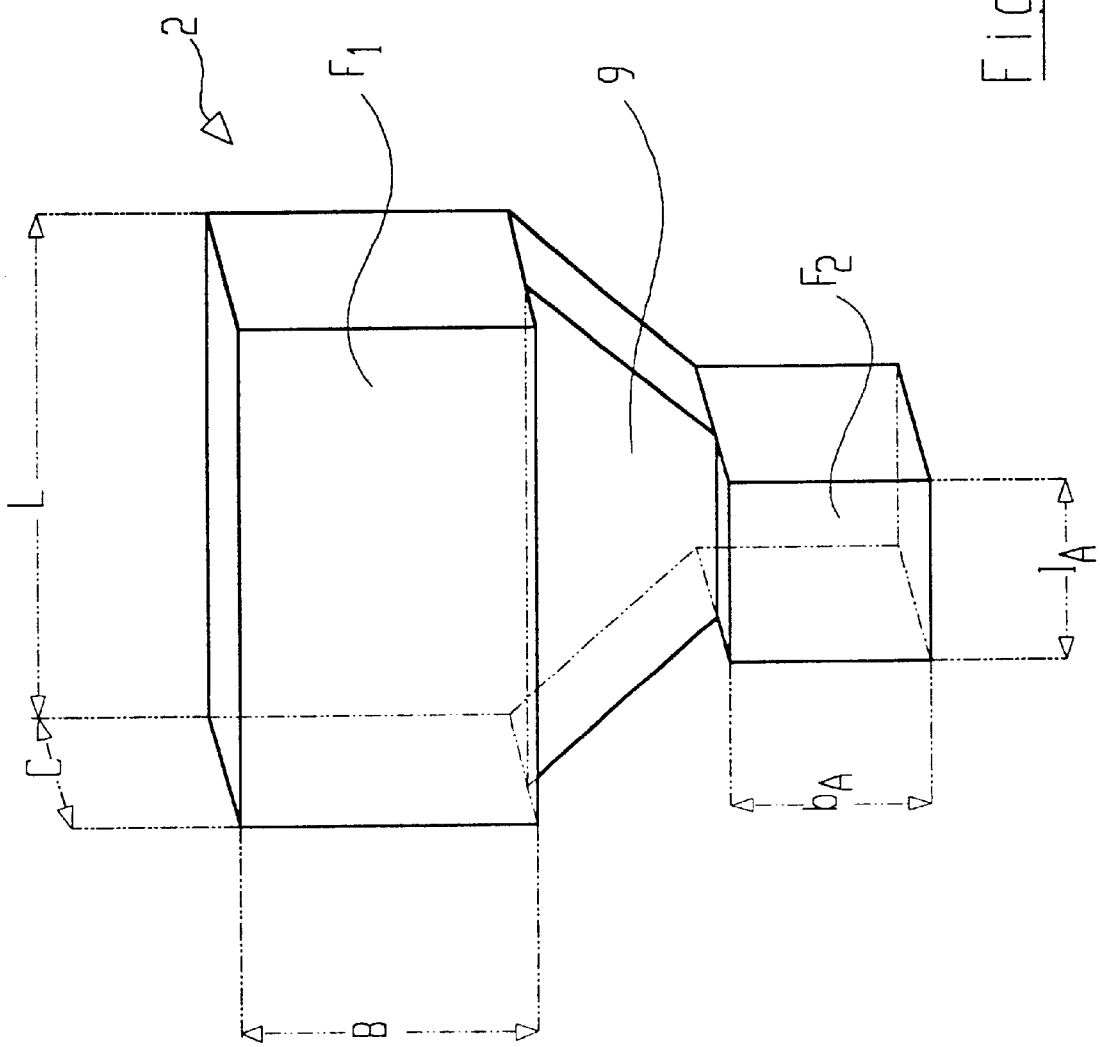
FIG. 3 is a perspective view of a flux-concentrating piece of FIGS. 1 and 2.

FIG. 3 shows a perspective view of one flux-concentrating piece 2 having an area $F_1$ for the primary air gap and the comparatively smaller area $F_2$ for the working air gap. The flux-concentrating piece 2 in this representation is parallelepipedic in the region of the areas F1, F2, while it goes without saying that other shapes also are possible. The recess 9 for guiding the plunger 10 is preferably located in the transitional region between the parallelepipeds (see FIG. 2).

Figure 4:
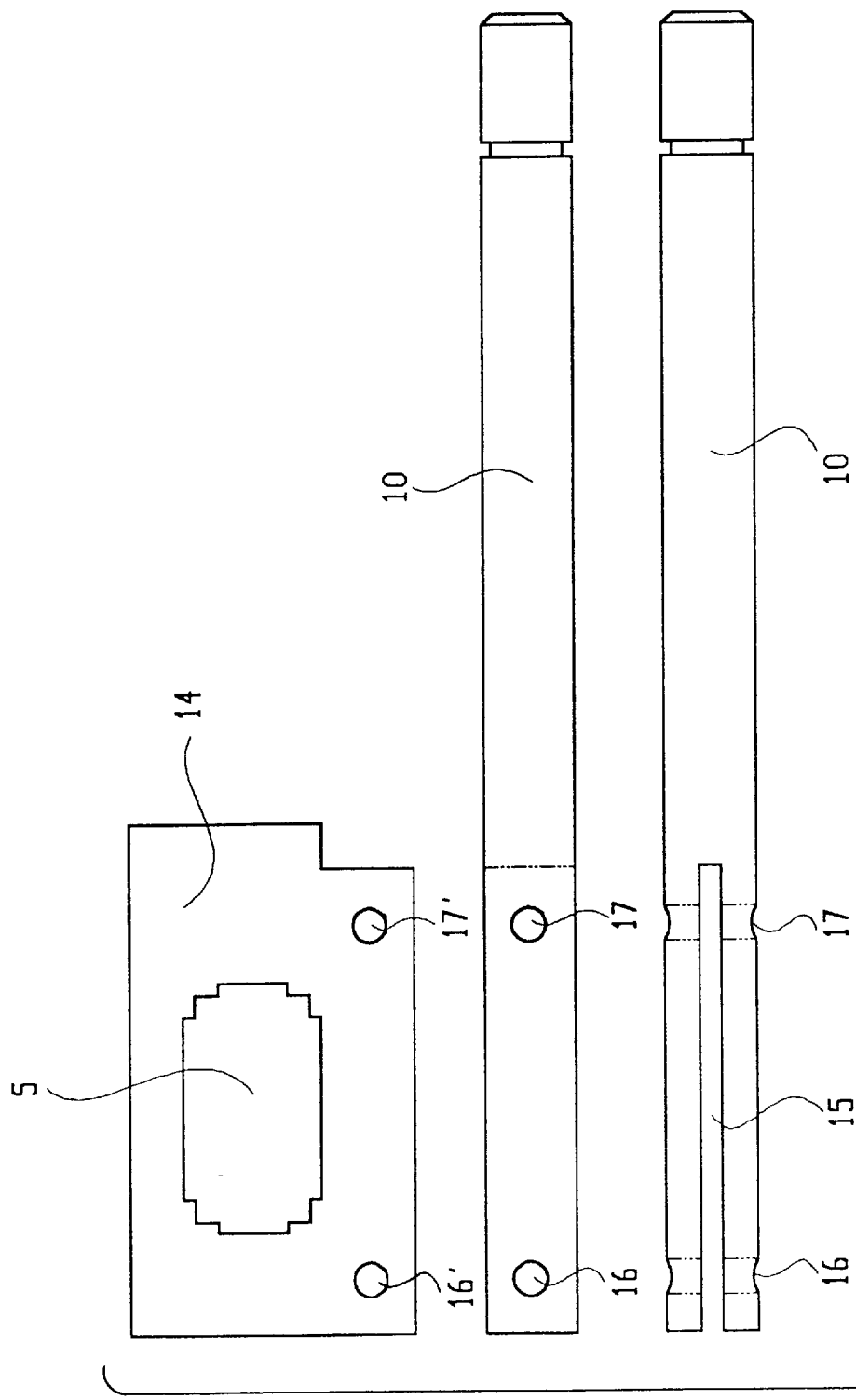
FIG. 4 is a top view of a magnet holder as well as two views of a plunger to which the magnet holder is mounted.

FIG. 4 shows the plunger 10 in two different side views, each rotated by 90°, and shows a magnet holder 14 for use with plunger 10. According to a preferred embodiment of the invention, the magnet holder 14 has a recess 5' in which magnet 5 is positioned. A region near one end of the plunger 10 preferably has a recess 15 corresponding to the thickness of magnet holder 14. This region also includes two drilled holes 16, 17 for use in mounting magnet holder 14, which has corresponding drilled holes 16', 17'. Magnet holder 14 is preferably mounted on plunger 10 using, for example, a rivet or screw connection. The magnet holder 14 and magnet 5 project laterally beyond the plunger 10. The plunger 10 and magnet holder 14 also may be produced as one unit, for example, with the use of injection molding technology.

Figure 5B:
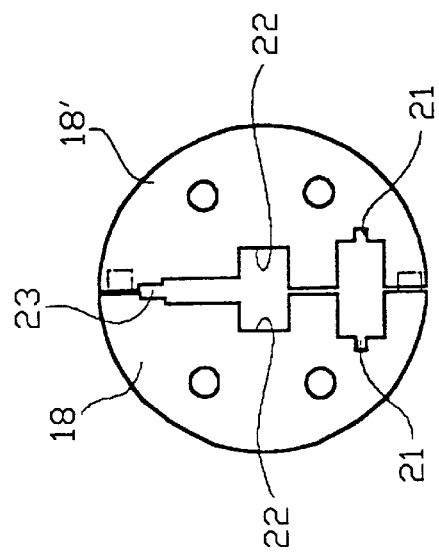
FIG. 5b, an end view of the housing.
Figure 5C:
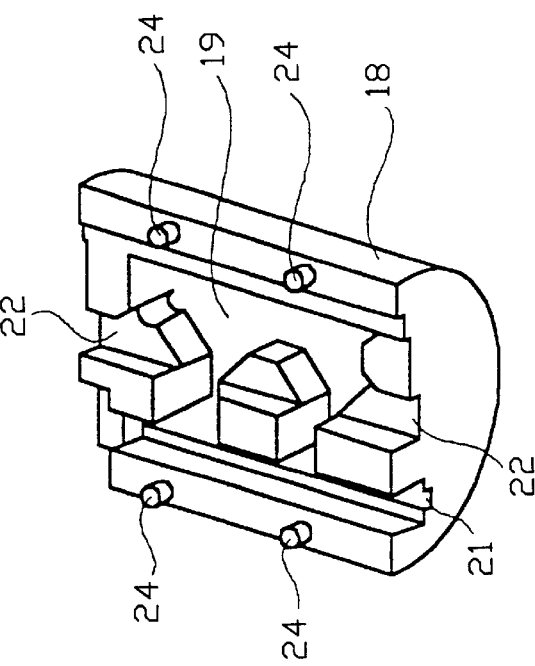
FIG. 5c, a perspective view of a housing half.
Figure 5A:
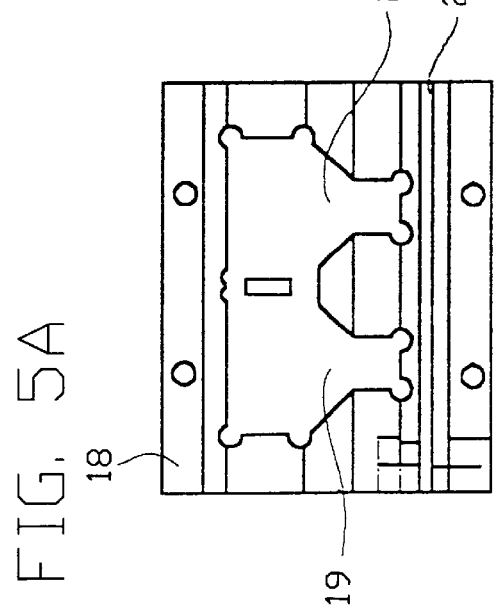
FIG. 5a, a top view of a housing half of the position sensor according to one embodiment of the invention.

Referring now to FIG. 5, a housing preferably receives the flux-concentrating pieces and guides the plunger and magnet. The housing consists of two plastic half-shells 18, 18'. The two retaining shells are essentially mirror symmetrical and each has two recesses 19, 20 corresponding to the outer contour of the flux-concentrating pieces. Both half-shells have a channel 21 running in the axial direction for receiving a printed-circuit board, from which the two Hall probes 7.1, 7.2 project into the given working gap. In addition, both half-shells have an axial recess 22, in which the plunger 10 may slide for shifting the magnet. An additional recess 23 having a somewhat narrowed cross section (see FIG. 5*b*) serves for guiding the magnet holder 14 which thereby slides only on the walls of said plastic recess 23 and does not mechanically rub against the flux-concentrating pieces. The edge area of one housing half 18 has four projecting pegs 24 which penetrate corresponding recesses of the other housing half 18' for essentially centering the two housing halves with respect to each other.

Figure 6:
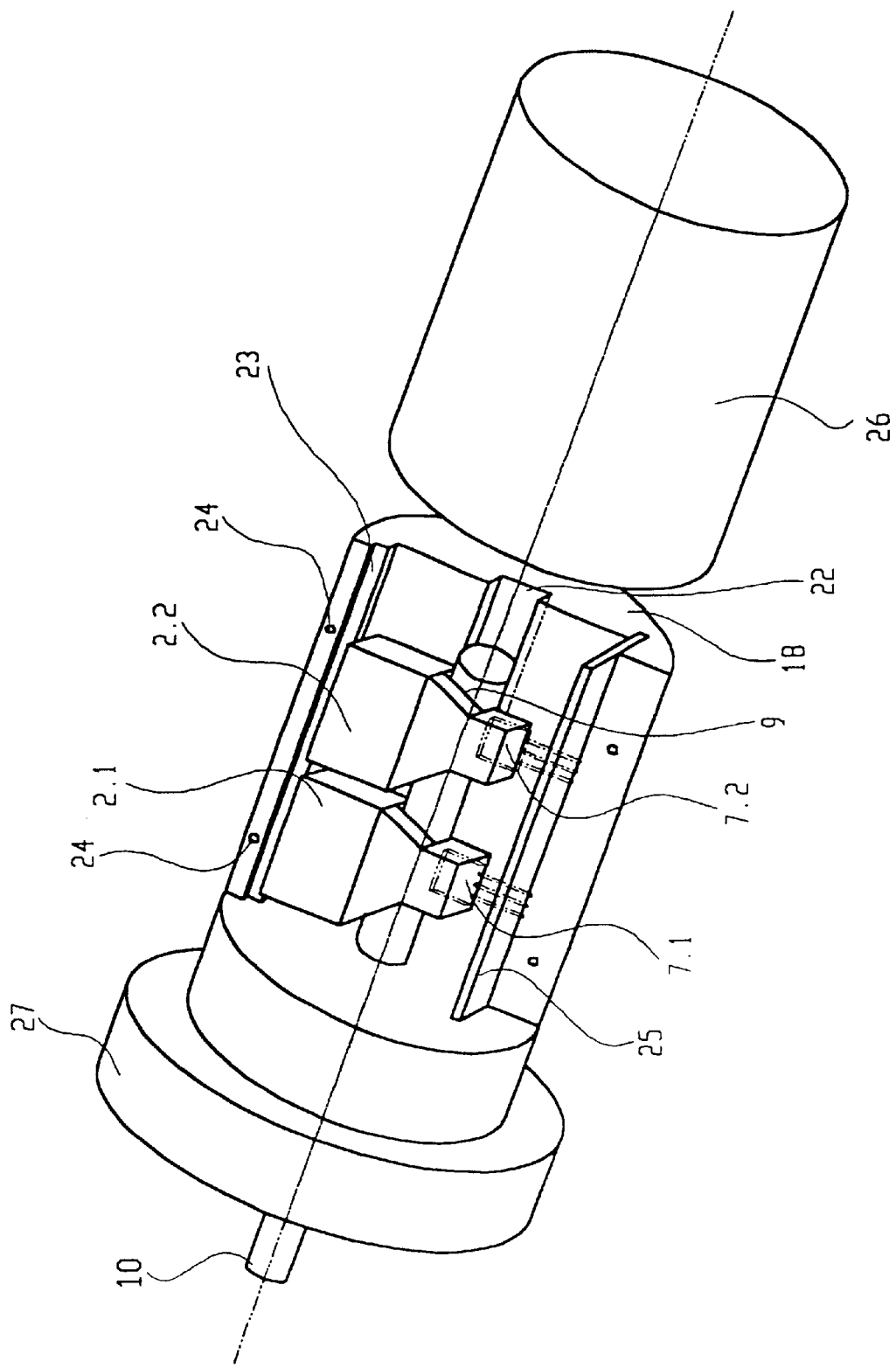
FIG. 6, a perspective view of an open position sensor according to the invention. Corresponding reference characters indicate corresponding parts throughout the drawings.

FIG. 6 provides a perspective view of one practical embodiment for a position sensor of the aforementioned type, with one housing half not yet in place. The lower housing half 18 may be seen as well as the upper flux-concentrating pieces 2.1, 2.2. In the illustrated embodiment, the printed-circuit board 25 having Hall probes 7.1, 7.2 is inserted in the one housing half. The housing is mounted to a flange 27 from which the plunger 10 projects. In a position sensor for a valve in an exhaust gas recirculation system, for example, the plunger 10 is connected to a valve. A bowl-like cover 26 of metal material, more specifically of ferromagnetic material, is inserted into the overall housing such that besides mechanical protection, there is also a shielding against other electromagnetic interference fields.

The housing parts may be manufactured economically using a plastic injection molding process. Likewise, the plunger and magnet holder may be produced as an integrated element using an injection molding process. The printed-circuit board 25 may contain other electronic components besides the Hall probes 7.1, 7.2. The plunger is of non-magnetic material, so that it does not conduct magnetic flux.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A position sensor comprising:
   at least one pair of ferromagnetic flux-concentrating pieces, each pair of said flux-concentrating pieces defining a primary air gap and a working air gap therebetween;
   one single permanent magnet positioned in the primary air gap between the flux-concentrating pieces, said magnet being movable within the primary air gap along a shifting direction; and
   at least one magnetic field sensor positioned in said working air gap between the flux-concentrating pieces, said magnetic field sensor having a direction of measuring sensitivity and being arranged relative to the working air gap so that the direction of measuring sensitivity of the magnetic field sensor is substantially perpendicular to the shifting direction of the magnet.

2. The position sensor of claim 1 wherein the flux-concentrating pieces are arranged substantially symmetrically about a central plane.

3. The position sensor of claim 2 wherein the primary air gap and the working air gap are approximately centered about the central plane.

4. The position sensor of claim 2 wherein the permanent magnet intersects the central plane and is approximately centered in the primary air gap between the flux-conducting pieces.

5. The position sensor of claim 1 wherein the primary air gap has an effective area $F_1$ and the working air gap has an effective area $F_2$, said effective area $F_2$ of the working air gap is smaller than the effective area $F_1$ of the primary air gap.

6. The position sensor of claim 1 further comprising a plunger for moving the magnet in the shifting direction and wherein the flux-conducting pieces include corresponding recesses through which the plunger is guided.

7. The position sensor of claim 6 wherein the plunger intersects the central plane and is approximately centered in the recesses of the flux-conducting pieces.

8. The position sensor of claim 6 wherein the plunger has a longitudinal axis substantially parallel with the shifting direction of the permanent magnet.

9. The position sensor of claim 6 further comprising a magnet holder mounted on plunger for holding the permanent magnet in the primary air gap.

10. The position sensor of claim 1 wherein the flux-concentrating pieces comprise two pairs of flux-concentrating pieces arranged in succession in the shifting direction of the permanent magnet and separated by a coupling gap.

11. The position sensor of claim 10 further comprising a Hall probe arranged in the working air gap of each pair of flux-concentrating pieces.

12. A position sensor comprising:
   first and second pairs of ferromagnetic flux-concentrating pieces, each pair of flux-concentrating pieces defining a primary air gap and a corresponding working air gap therebetween, each primary air gap being separated from its corresponding working air gap;
   one single permanent magnet positioned in the primary air gaps between the flux-concentrating pieces, said magnet being movable within the primary air gaps along a shifting direction, said first and second pairs of flux-concentrating pieces being arranged adjacent each other so that the permanent magnet is movable within the primary air gap of each pair of flux-concentrating pieces; and
   at least one magnetic field sensor positioned in the working air gap between each pair of flux-concentrating pieces, said magnetic field sensor having a direction of measuring sensitivity and being arranged relative to the respective working air gap so that the direction of measuring sensitivity of the magnetic field sensor is substantially perpendicular to the shifting direction of the permanent magnet.

13. A position sensor having a permanent magnet, which may be linearly shifted in a primary air gap between ferromagnetic flux-concentrating pieces such that the magnetic flux runs from the magnet via the primary air gap through the pole pieces and through a working air gap, and having a magnetic field sensor arranged in the working air gap between the flux-concentrating pieces, wherein the magnetic field sensors and the working air gap are arranged such that the measuring sensitivity of the magnetic field sensor is perpendicular to the shifting direction of the magnet.

\* \* \* \* \*